(12) United States Patent
Hatanaka

(10) Patent No.: US 9,461,506 B2
(45) Date of Patent: Oct. 4, 2016

(54) WIRELESS POWER-SUPPLY SYSTEM

(75) Inventor: Takezo Hatanaka, Ibaraki (JP)

(73) Assignee: NITTO DENKO CORPORATION, Ibaraki-Shi (JP)

(*) Notice: Subject to any disclaimer, the term of this patent is extended or adjusted under 35 U.S.C. 154(b) by 430 days.

(21) Appl. No.: 13/983,085

(22) PCT Filed: Feb. 3, 2012

(86) PCT No.: PCT/JP2012/052449
§ 371 (c)(1),
(2), (4) Date: Oct. 18, 2013

(87) PCT Pub. No.: WO2012/105675
PCT Pub. Date: Aug. 9, 2012

(65) Prior Publication Data
US 2014/0035385 A1   Feb. 6, 2014

(30) Foreign Application Priority Data

Feb. 4, 2011 (JP) .................................. 2011-022920

(51) Int. Cl.
*H02J 17/00* (2006.01)
*H02J 5/00* (2016.01)
(Continued)

(52) U.S. Cl.
CPC ............... *H02J 17/00* (2013.01); *H02J 5/005* (2013.01); *H02J 7/025* (2013.01); *H04B 5/0075* (2013.01); *H04B 5/0037* (2013.01)

(58) Field of Classification Search
CPC .......... H02J 17/00; H02J 5/005; H02J 7/025; H02J 3/01; H01F 38/14; B60L 11/182; B60L 11/1829; B60L 11/1831; Y02T 90/122; H04B 5/0037

USPC ......................................................... 307/104
See application file for complete search history.

(56) References Cited

U.S. PATENT DOCUMENTS

2009/0160261 A1* 6/2009 Elo .......................... H02J 5/005
                                                                307/104
2010/0065352 A1* 3/2010 Ichikawa .............. B60L 11/182
                                                                180/65.8
(Continued)

FOREIGN PATENT DOCUMENTS

CN           101197507 A     6/2008
CN           101594010 A    12/2009
(Continued)

OTHER PUBLICATIONS

International Preliminary Report on Patentability issued in International Patent Application No. PCT/JP2012/052449 dated Aug. 6, 2013 (with translation).
(Continued)

*Primary Examiner* — Kenneth B Wells
*Assistant Examiner* — Rafael Pacheco
(74) *Attorney, Agent, or Firm* — Oliff PLC

(57) ABSTRACT

The purpose of the present invention is to provide a wireless power-supply system using magnetic resonance, which is different from the conventional point of view. In a wireless power-supply system (101), the positional relationship (distance C) between a power-supply resonator (102) and a power-receiving resonator (103) denotes the power-supply range (F). In the power-supply range (F), the electric power transmitted as magnetic energy by resonating the power supply resonator (102) and the power receiving resonator (103) is more than the predetermined effective power. Therefore, the predetermined effective power can be transmitted only in the power-supply range (F) that maintains the positional relationship. On the other hand, when the power-receiving resonator (103) deviates from the power-supply range (F), the electric power cannot be transmitted.

6 Claims, 9 Drawing Sheets

(51) Int. Cl.
*H02J 7/02* (2016.01)
*H04B 5/00* (2006.01)

(56) References Cited

U.S. PATENT DOCUMENTS

| | | |
|---|---|---|
| 2010/0123452 A1 | 5/2010 | Amano et al. |
| 2010/0201189 A1 | 8/2010 | Kirby et al. |
| 2010/0201316 A1 | 8/2010 | Takada et al. |
| 2010/0244580 A1 | 9/2010 | Uchida et al. |
| 2010/0244581 A1 | 9/2010 | Uchida |
| 2010/0244583 A1 | 9/2010 | Shimokawa |
| 2012/0098348 A1 | 4/2012 | Inoue et al. |

FOREIGN PATENT DOCUMENTS

| | | |
|---|---|---|
| JP | A-2007-104868 | 4/2007 |
| JP | 3158938 U | 3/2010 |
| JP | A-2010-124522 | 6/2010 |
| JP | 2010-183811 A | 8/2010 |
| JP | 2010-183813 A | 8/2010 |
| JP | 2010-233394 A | 10/2010 |
| JP | 2010-246348 A | 10/2010 |
| JP | A-2010-239769 | 10/2010 |
| JP | A-2010-239777 | 10/2010 |
| JP | 2010-252446 A | 11/2010 |
| TW | 201042878 A | 12/2010 |

OTHER PUBLICATIONS

International Search Report issued in International Patent Application No. PCT/JP2012/052449 dated May 1, 2012 (with translation).
Dec. 31, 2014 Office Action issued in Chinese Application No. 201280007610.3.
Jan. 13, 2015 Office Action issued in Japanese Patent Application No. 2011-022920.
Sep. 24, 2014 Office Action issued in Japanese Patent Application No. 2011-022920.
Aug. 17, 2015 Office Action issued in Chinese Patent Application No. 201280007610.3.
Feb. 16, 2016 Office Action issued in Japanese Application No. 2015-052552.
Jan. 5, 2016 Office Action issued in Taiwanese Patent Application No. 101103561.
Mar. 1, 2016 European Search Report issued in European Application No. 12 741 907.5.
Chih-Jung Chen et al: "A Study of Loosely Coupled Coils for Wireless Power Transfer", IEEE Transactions of Circuits and Systems II: Express Briefs, IEEE, US, vol. 57 No. 7, Jul. 1, 2010 (Jul. 1, 2010) pp. 536-540.
Andre Kurs et al.: "Wireless Power Transfer via Strongly Coupled Magnetic Resonances", Science American Association for the Advancement of Science, US, vol. 317, No. 5834, Jul. 6, 2007 (Jul. 6, 2007) pp. 83-86.
Feb. 26, 2016 Office Action issued in Chinese Application No. 201280007610.3.

* cited by examiner

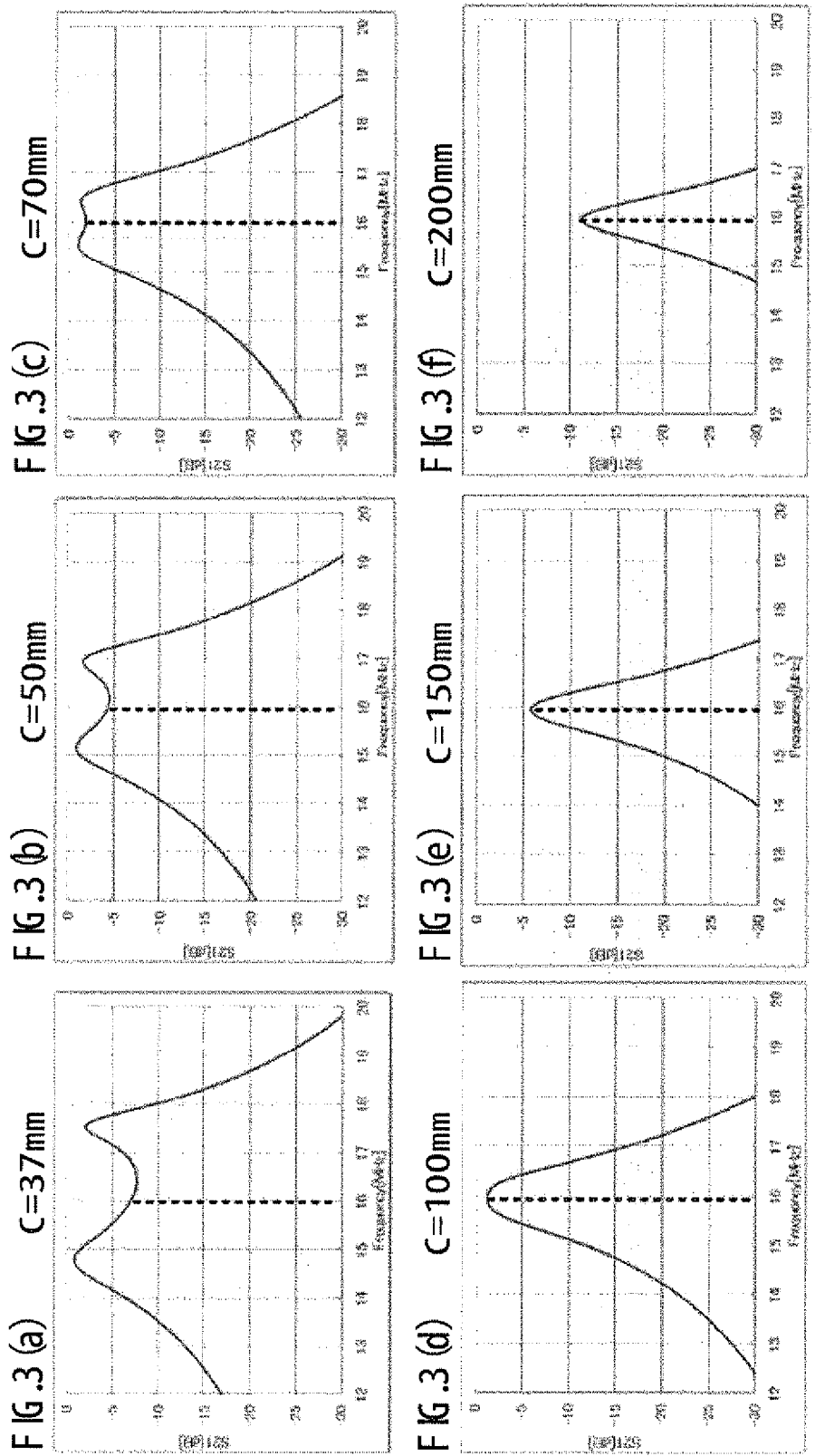

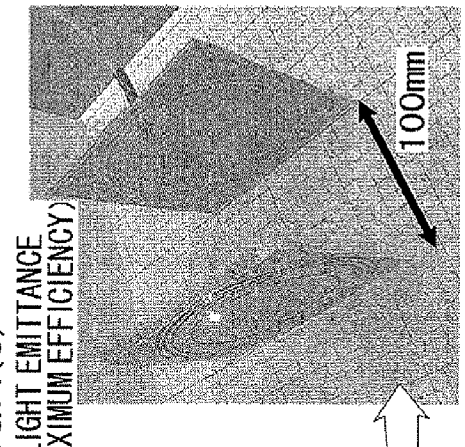
FIG.4(c) LIGHT EMITTANCE (MAXIMUM EFFICIENCY)
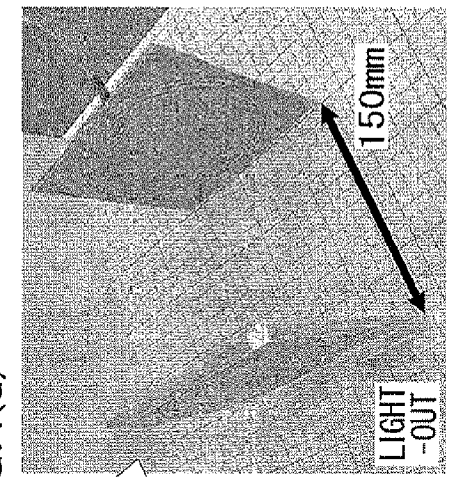
FIG.4(d)
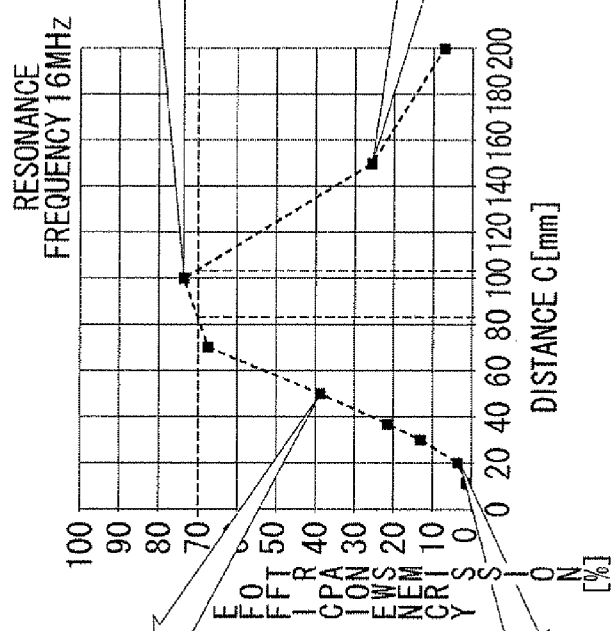
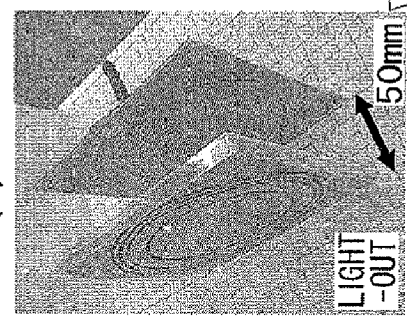
FIG.4(b)
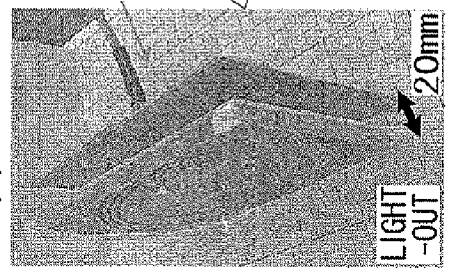
FIG.4(a)

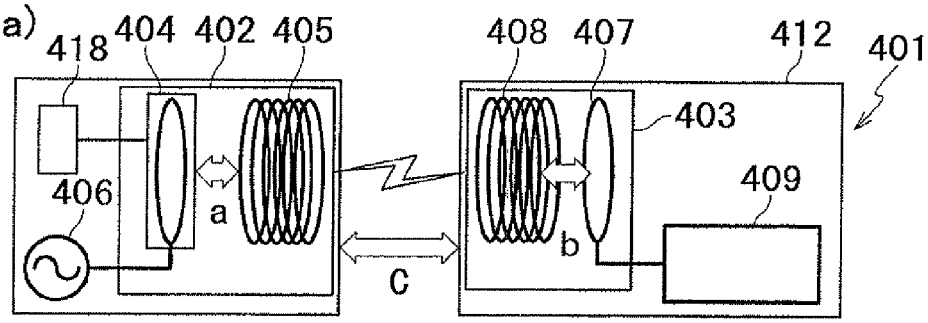
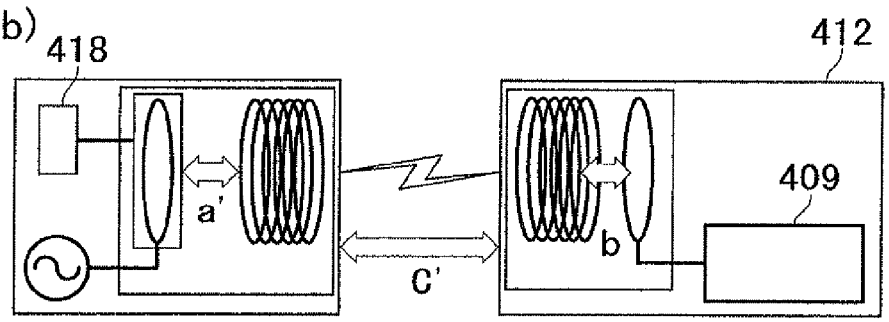
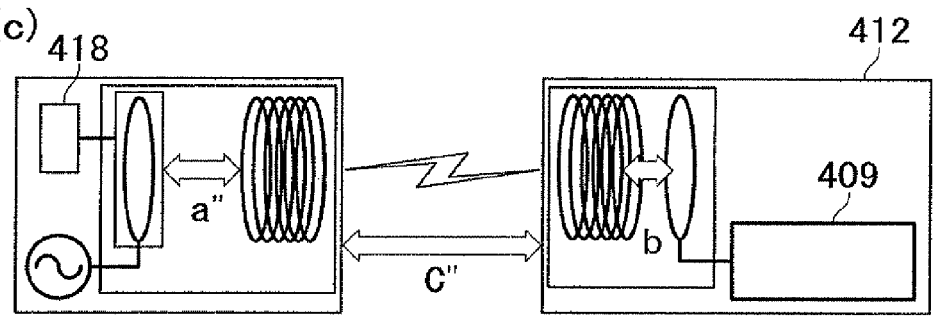
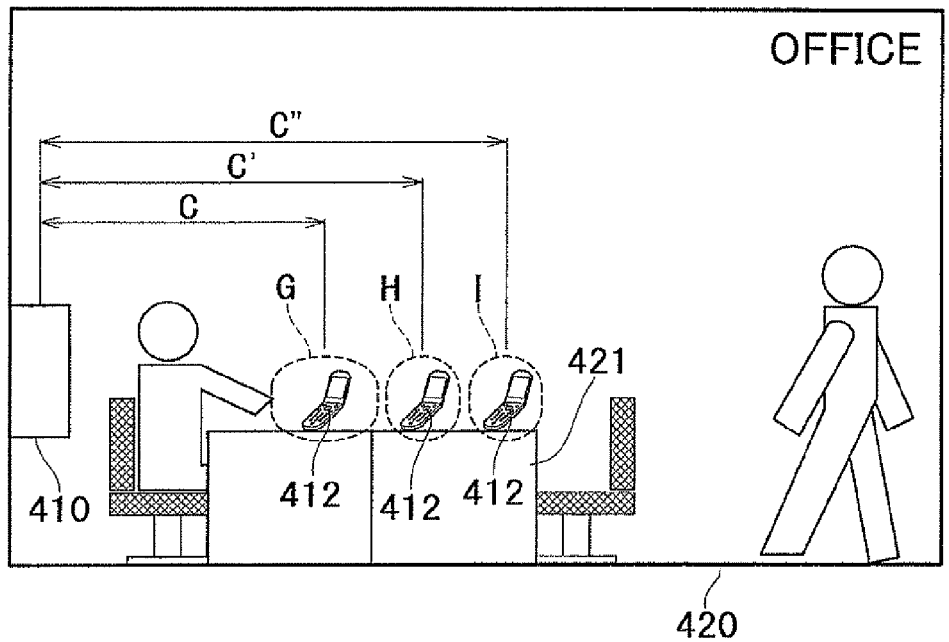

WIRELESS POWER-SUPPLY SYSTEM

TECHNICAL FIELD

The present invention relates to a wireless power-supply system which creates a magnetic resonant state to conduct contactless power transmission.

BACKGROUND ART

Traditionally, there has been a power supplying technology utilizing electromagnetic inductance, and the one utilizing electromagnetic wave. In addition to these, a wireless power-supply technology utilizing a magnetic resonant state has been suggested in recent years.

The power-supply technology utilizing this magnetic resonant state (also known as magnetic resonance, magnetic field resonance, magnetic field resonance) enables transmission of energy (power) by means of coupling magnetic fields of two resonators which resonate with each other. This wireless power-supply technology utilizing a magnetic resonant state enables energy (power) transmission of a longer distance than the wireless power-supply technology utilizing electromagnetic inductance.

For example, PTL 1 discloses a wireless power-supply system which changes a resonance frequency of a power transmission resonance coil and that of a power-reception end resonance coil so as to maintain the resonant state by varying the coupling strength between the power transmission resonance coil and the power-reception end resonance coil, thereby preventing deterioration in the power transmission efficiency from a power transmission device to a power-receiving device, even when the distance between the power transmission resonance coil and the power-reception end resonance coil varies. Further, PTL 2 discloses a wireless power device which varies the coupling strength between a power transmission coil and a power-receiving coil thereby enhancing the power transmission efficiency of the entire device. Further, PTL 3 discloses a power supply system capable of conducting contactless power supply, which includes a power-supplying end resonance coil and a power-receiving end resonance coil between a power-supplying coil and a power-supplying coil, and which is capable of maintain or improve the power supplying efficiency irrespective of variation in the distance between the power-supplying end resonance coil and the power-receiving end resonance coil.

CITATION LIST

Patent Literature

[PTL 1] Japanese Unexamined Patent Publication No. 239769/2010 (Tokukai 2010-239769)
[PTL 2] Japanese Unexamined Patent Publication No. 239777/2010 (Tokukai 2010-239777)
[PTL 3] Japanese Unexamined Patent Publication No. 124522/2010 (Tokukai 2010-124522)

SUMMARY OF INVENTION

Technical Problem

As disclosed in PTL 1 to PTL 3, a wireless power-supply technology utilizing a magnetic resonant state is attracting attention in recent years, and there has been a demand for more power supplying system utilizing a magnetic resonant state.

Given the circumstances, it is an object of the present invention to provide a wireless power-supply system utilizing a magnetic resonant state, which is at all different from the conventional point of view.

Technical Solution

To achieve the above object, an aspect of the present invention is a wireless power-supply system such that a positional relation between a power-supplying resonator and a power-receiving resonator is set to a power supply range in which power transmitted in the form of electromagnetic energy by having the power-supplying resonator and the power-receiving resonator resonating with each other yields predetermined effective power or more.

With the above structure, predetermined effective power is transmitted only when the power-supplying resonator and the power-receiving resonator are placed to satisfy the positional relation, i.e., within the power supply range, such that the power transmitted in the form of electromagnetic energy by having the power-supplying resonator and the power-receiving resonator resonating with each other is the predetermined effective power.

To achieve the above object, the above described wireless power-supply system of the aspect of the present invention includes: a power supply unit configured to supply power; the power-supplying resonator configured to transmit the power supplied from the power supply unit in the form of electromagnetic energy; the power-receiving resonator having a same resonance frequency as that of the power-supplying resonator, which is configured to receive the electromagnetic energy transmitted from the power-supplying resonator in the form of power; a power-receiving unit configured to operate when the power received by and output from the power-receiving resonator is the predetermined effective power or more, wherein the positional relation between the power-supplying resonator and the power-receiving resonator is such that, at the resonance frequency, a rate of the power output to the power-receiving unit relative to the power supplied to the power-supplying resonator is a rate that yields effective power or more.

The above structure enables transmission of power supplied from the power supply unit in the form of electromagnetic energy, from the power-supplying resonator to the power-receiving resonator, by tuning the power-supplying resonator and the power-receiving resonator to the resonance frequency, thus creating a magnetic resonant state between the power-supplying resonator and the power-receiving resonator. The power-receiving unit is able to operate when the power received through the power transmission is predetermined effective power or higher.

By setting the positional relation between the power-supplying resonator and the power-receiving resonator so as to achieve, at the resonance frequency band, a rate of power output to the power-receiving unit relative to the power supplied to the power-supplying resonator, which yields effective power or more, the power-receiving resonator is able to highly efficiently receive the effective power when that positional relation is satisfied. On the other hand, when the power-receiving resonator is placed so that the positional relation is not satisfied, the power reception efficiency of the power-receiving resonator drops and the predetermined effective power is not received. Thus, the effective power necessary for operating the power-receiving unit is output to the power-receiving unit, only when the power-supplying resonator and the power-receiving resonator satisfy the above positional relation.

To achieve the above object the above-described wireless power-supply system is adapted so that: the power-supplying resonator includes a power-supplying coil connected to the power supply unit and a power-supply end resonance coil; and the power-receiving resonator includes a power-receiving coil connected to the power-receiving unit and a power-reception end resonance coil.

The above structure enables power transmission from the power-supplying coil to the power-supply end resonance coil by means of electromagnetic inductance, without a need of creating a magnetic resonant state between the power-supplying coil and the power-supply end resonance coil. Further, similarly, the structure enables power transmission from the power-reception end resonance coil to the power-receiving coil by means of electromagnetic inductance, without a need of creating a magnetic resonant state between the power-reception end resonance coil and the power-receiving coil. This eliminates the need of tuning the power-supplying coil and the power-supply end resonance coil to a resonance frequency, and tuning the power-reception end resonance coil and the power-receiving coil to the resonance frequency. Thus, designing becomes easier.

To achieve the above object, the above-described wireless power-supply system is adapted so that: a first distance between the power-supplying coil and the power-supply end resonance coil and/or a second distance between the power-reception end resonance coil and the power-receiving coil is freely settable.

The above structure allows freedom in setting of a position which, at the resonance frequency band, brings about a rate of power output to the power-receiving unit relative to the power supplied to the power-supply end resonance coil, which rate yields effective power or more, simply by setting the first distance between the power-supplying coil and the power-supply end resonance coil and/or the second distance between the power-reception end resonance coil and the power-receiving coil to a desirable value.

Another aspect of the present invention is a wireless power-supply method, including setting of a positional relation between a power-supplying resonator and a power-receiving resonator to a power supply range in which power transmitted in the form of electromagnetic energy by having the power-supplying resonator and the power-receiving resonator resonating with each other yields a predetermined effective power or more.

With the above method, predetermined effective power is transmitted only when the power-supplying resonator and the power-receiving resonator are placed to satisfy the positional relation, i.e., within the power supply range, such that the power transmitted in the form of electromagnetic energy transmitted by having the power-supplying resonator and the power-receiving resonator resonating with each other is the predetermined effective power.

Advantageous Effect

There is provided a wireless power-supply system utilizing a magnetic resonant state which is at all different from the conventional point of view.

BRIEF DESCRIPTION OF DRAWINGS

FIG. 3 is a diagram showing a measurement result of the insertion loss, when a distance C between a power-supply end resonance coil and a power-reception end resonance coil is varied.

FIG. 4 is an explanatory diagram explaining, in the form of light emission from a blue LED, the power transmission efficiency when the distance C between the power-supply end resonance coil and the power-reception end resonance coil is varied.

FIG. 8 is an explanatory diagram of a wireless power-supply system related to an embodiment 2.

DESCRIPTION OF EMBODIMENTS

Figure 1:
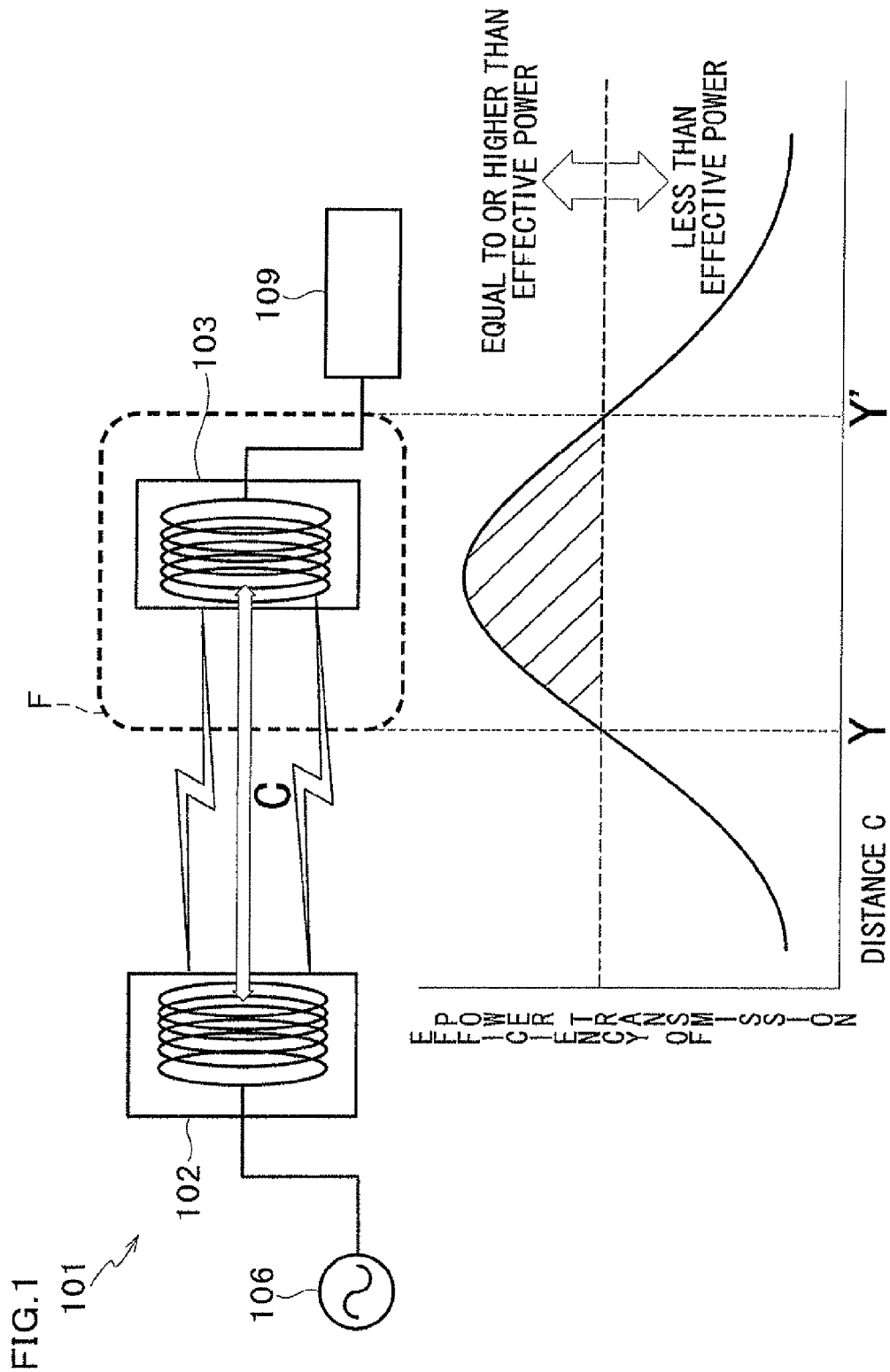
FIG. 1 is an explanatory diagram of a wireless power-supply system related to the present invention.

First, the following describes an overview of a wireless power-supply system and a wireless power-supply method related to the present invention, with reference to FIG. 1.

As shown in FIG. 1, a wireless power-supply system 101 related to the present invention sets, as a power supply range F, a positional relation (distance C) of a power-supplying resonator 102 to a power-receiving resonator 103 such that electromagnetic energy transmitted by resonating the power-supplying resonator 102 with the power-receiving resonator 103 becomes a predetermined effective power or more.

The power-supplying resonator 102 and the power-receiving resonator 103 are each a resonator using a coil. Examples of the coil includes spiral coils, solenoid coils, loop coils. Resonance is the power-supplying resonator 102 and the power-receiving resonator 103 being tuned to a resonance frequency (which occurs, for example, when a power having the same frequency as the resonance frequency of the power-supplying resonator 102 and the power-receiving resonator 103 is output from an AC power source 106). The predetermined effective power is the power required on the side of the power-receiving resonator 103, and is a value set according to the need (e.g., power required for a power-receiving unit 109 to operate). The positional relation between the power-supplying resonator 102 and the power-receiving resonator 103 is a direct distance between the coil surface of the coil used in the power-supplying resonator 102 and the coil surface of the coil used in the power-receiving resonator 103, when the coils are disposed so as not to perpendicularly intersect with each other (denoted by "distance C" in FIG. 1). The power supply range F is a range in which a power equal to or more than the predetermined effective power is transmitted (the distance C ranging from Y to Y' in FIG. 1).

Thus, by setting the positional relation between the power-supplying resonator 102 and the power-receiving resonator 103 such that the power transmitted as electromagnetic energy by having the power-supplying resonator 102 resonating with the power-receiving resonator 103 is equal to or more than the predetermined effective power, the predetermined effective power is transmitted only to the power-receiving resonator 103 within the power supply range F retaining the above positional relation. On the other hand, the power is not transmitted when the power-receiving resonator 103 is out of the power supply range F.

Example 1

Figure 2:
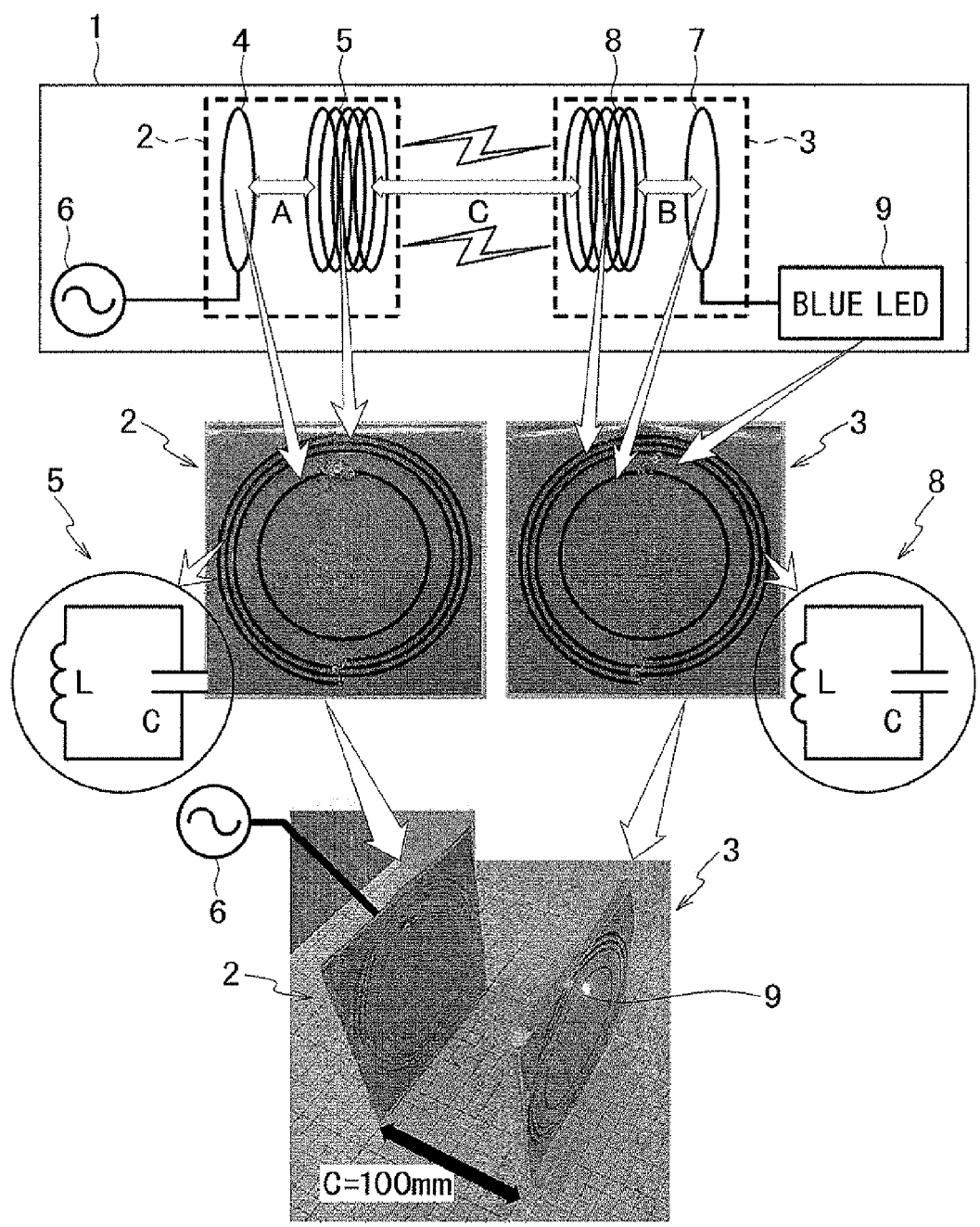
FIG. 2 is a diagram showing a schematic configuration of the wireless power-supply system related to an example 1.

Next, the following describes a wireless power-supply system 1 which is the above described wireless power-supply system 101 realized with a simple structure. The wireless power-supply system 1 shown in FIG. 2 includes a power-supplying resonator 2 and a power-receiving resonator 3, and transmits a power in the form of electromagnetic energy from the power-supplying resonator 2 to the power-receiving resonator 3. As shown in FIG. 2, the power-supplying resonator 2 includes therein a power-supplying coil 4 and a power-supply end resonance coil 5. The power-supplying coil 4 is connected to an AC power source 6 (power supply unit). The power-receiving resonator 3 includes therein a power-receiving coil 7 and a power-reception end resonance coil 8. The power-receiving coil 7 is connected to a blue LED 9 (power-receiving unit).

The AC power source 6 outputs a power at a frequency of 16 MHz which is the same as the resonance frequency of the power-supply end resonance coil 5 and the power-reception end resonance coil 8. As such, the power-supply end resonance coil 5 and the power-reception end resonance coil 8 resonates with each other at the resonance frequency of 16 MHz. Note that the present example deals with a case where the AC power source 6 outputs power of 0.5 W.

The blue LED 9 is a diode mainly made of gallium nitride and emits blue light. This blue LED 9 lights in blue when power of 0.35 W or higher, i.e., the effective power needed for light emission, is input. On the other hand, when the input power falls short of the effective power of 0.35 W, the blue LED 9 does not light.

The power-supplying coil 4 plays a role of supplying to the power-supply end resonance coil 5 the power from the AC power source 6 by means of electromagnetic inductance. The power-supplying coil 4 is a coil diameter of 80 mmϕ and is formed by winding once a rectangular copper wire rod (coated by insulation film) with each side of its cross section being 2 mm.

As described, power transmission in the form of electromagnetic inductance to the power-supply end resonance coil 5 through the power-supplying coil 4 eliminates the need for electrically connecting the power-supply end resonance coil 5 to another circuit. This allows more freedom and higher accuracy in designing of the power-supply end resonance coil 5.

The power-receiving coil 7 plays a role of outputting the power transmitted in the form of electromagnetic energy from the power-supply end resonance coil 5 to the power-reception end resonance coil 8 to the blue LED 9 by means of electromagnetic inductance. The power-receiving coil 7 is a coil diameter of 80 mmϕ and is formed by winding once a rectangular copper wire rod (coated by insulation film) with each side of its cross section being 2 mm, as in the case of the power-supplying coil 4.

The power transmitted to the power-reception end resonance coil 8 in the magnetic resonant state is transmitted in the form of energy from the power-reception end resonance coil 8 to the power-receiving coil 7 by means of electromagnetic inductance. The power-receiving coil 7 is electrically connected to the blue LED 9, the energy transmitted to the power-receiving coil 7 by means of electromagnetic inductance is output to the blue LED 9 as its power.

As described, power transmission from the power-reception end resonance coil 8 to the blue LED 9 via the power-receiving coil 7 by means of electromagnetic inductance eliminates the need for electrically connecting the power-reception end resonance coil 8 to another circuit. This allows more freedom and higher accuracy in designing of the power-reception end resonance coil 8.

As shown in FIG. 2, the power-supply end resonance coil 5 and the power-reception end resonance coil 8 are each an LC resonance circuit which creates a magnetic resonant state. Note that the present example adopts an element as a capacitor component of the LC resonance circuit; however, it is possible to adopt a stray capacitance by leaving the both ends of the coil opened. The resonance frequency in this LC resonance circuit is f, which is derived from the following (formula 1), where the inductance is L and the capacity of capacitor is C.

$$f=1/(2\pi\sqrt{(LC)})$$ (formula 1)

Further, the power-supply end resonance coil 5 and the power-reception end resonance coil 8 each has a coil inner diameter of 100 mmϕ and a coil outer diameter of 124 mmϕ, and is made by winding three times a rectangular copper wire rod (coated by insulation film) with each side of its cross section being 2 mm. Further, as it is necessary to set the same resonance frequency f defined by the (formula 1) in the power-supply end resonance coil 5 and the power-reception end resonance coil 8, the resonance frequency is set to 16 MHz. Note that it is not necessary to make the shapes of the coils the same, in order to make the resonance frequency the same.

In the present example, as shown in FIG. 2, the power-supplying coil 4 and the power-supply end resonance coil 5 are disposed by printing on a single plane substrate with the distance between the inner diameter of the power-supplying coil 4 and that of the power-supply end resonance coil 5 between 10 mm, thereby forming the power-supplying resonator 2. However, the arrangement of the power-supplying coil 4 and the power-supply end resonance coil 5 is not limited as long as the distance therebetween allows occurrence of electromagnetic inductance. Similarly, the power-receiving coil 7 and the power-reception end resonance coil 8 are disposed by printing on a single plane substrate with the distance between the inner diameter of the power-receiving coil 7 and that of the power-reception end resonance coil 8 being 10 mm, thereby forming the power-receiving resonator 3. However, the arrangement of the power-receiving coil 7 and the power-reception end resonance coil 8 is not limited as long as the distance therebetween allows occurrence of electromagnetic inductance.

As described, when the resonance frequency of the power-supply end resonance coil 5 and the resonance frequency of the power-reception end resonance coil 8 are equal to each other, the magnetic resonant state is created between the power-supply end resonance coil 5 and the power-reception end resonance coil 8. Creating the magnetic resonant state while the power-supply end resonance coil 5 is resonating enables power transmission from the power-supply end resonance coil 5 to the power-reception end resonance coil 8 in the form of electromagnetic energy.

Further, where the distance between the power-supply end resonance coil 5 and the power-reception end resonance coil 8 is C, the power-supplying resonator 2 and the power-receiving resonator 3 are arranged so as to satisfy the positional relation between the power-supply end resonance coil 5 and the power-reception end resonance coil 8 such that the distance C between the power-supply end resonance coil 5 and the power-reception end resonance coil 8 is 100 mm.

The following describes the reason why the distance C between the power-supply end resonance coil 5 and the power-reception end resonance coil 8 is set to 100 mm. The following describes, with reference to FIG. 3 and FIG. 4, variation in the power transmission efficiency when the distance C between the power-supply end resonance coil 5 and the power-reception end resonance coil 8 in the wireless power-supply system 1 is varied. In the following case, the power-supplying coil 4 and the power-supply end resonance coil 5 are fixed to a single substrate, and the power-reception end resonance coil 8 and the power-receiving coil 7 are fixed to a single substrate. Note that, to measure the power transmission efficiency, the power-supplying coil 4 is connected to an output terminal of a network analyzer (produced by Agilent Technologies, Inc.), in place of an AC power source 6, and the power-receiving coil 7 is connected to an input terminal of the network analyzer, in place of the blue LED 9. In FIG. 3, the horizontal axis represents the transmission frequency, and the vertical axis represents the insertion loss "S21". In FIG. 4, the horizontal axis of the graph is the distance C, and the vertical axis of the same is the power transmission efficiency.

The power transmission efficiency is a rate of power output to the power-receiving unit versus the power supplied to the power-supplying resonator. In other words, the power transmission efficiency is energy transmission efficiency when power is transmitted from the power-supplying resonator to the power-receiving resonator. The insertion loss "S21" indicates signals passing through the input terminal, when signals from the output terminal is input to the input terminal. The insertion loss "S21" is indicated in decibel, and the larger the value, the higher the power transmission efficiency. In other words, the higher the insertion loss "S21", the higher the rate (power transmission efficiency) of power output to the blue LED 9 as the power-receiving unit relative to the power supplied to the power-supplying resonator 2.

The following describes with reference to FIG. 3 and FIG. 4, the measurement results of the insertion loss "S21" and the power transmission efficiency, with various distance C between the power-supply end resonance coil 5 and the power-reception end resonance coil 8. FIG. 3 (a) shows the measurement result of the insertion loss "S21" when the distance C=37 mm. FIG. 3 (b) shows the measurement result of the insertion loss "S21" when the distance C=50 mm. FIG. 3 (c) shows the measurement result of the insertion loss "S21" when the distance C=70 mm. FIG. 3 (d) shows the measurement result of the insertion loss "S21" when the distance C=100 mm. FIG. 3 (e) shows the measurement result of the insertion loss "S21" when the distance C=150 mm. FIG. 3 (f) shows the measurement result of the insertion loss "S21" when the distance C=200 mm.

During the magnetic resonant state between the power-supply end resonance coil 5 and the power-reception end resonance coil 8, the transmission frequency where the electromagnetic energy reaches its peak (the transmission frequency where the power transmission efficiency is maximized) is frequencies nearby the resonance frequency (16 MHz in the present example). However, as shown in FIG. 3(a) to FIG. 3(c), when the distance C between the power-supply end resonance coil 5 and the power-reception end resonance coil 8 is shortened to a certain extent (C=37 mm, 50 mm, 70 mm), a split is confirmed in a range of transmission frequencies where the value of "S21" is maximized, and the value of "S21" is lowered at the resonance frequency. That is to say that, when the distance C between the power-supply end resonance coil 5 and the power-reception end resonance coil 8 is shortened to a certain extent, the power transmission efficiency is lowered at the resonance frequency band, as shown in FIG. 4.

On the other hand, as shown in FIG. 3(d), when the distance C between the power-supply end resonance coil 5 and the power-reception end resonance coil 8 is set to 100 mm (as in the present example), the value of "S21" is maximized nearby the resonance frequency. That is to say that, when the distance C between the power-supply end resonance coil 5 and the power-reception end resonance coil 8 is set to 100 mm, the power transmission efficiency is maximized (power transmission efficiency 74%) at the resonance frequency (16 MHz) band as shown in FIG. 4.

Further, as shown in FIG. 3(e) and FIG. 3(f), when the distance C between the power-supply end resonance coil 5 and the power-reception end resonance coil 8 is made long to a certain extent (C=150 mm, 200 mm), the value of "S21" nearby the resonance frequency itself is lowered, although no split is confirmed in the range of transmission frequencies where the "S21" is maximized. That is to say that, when the distance C between the power-supply end resonance coil 5 and the power-reception end resonance coil 8 is made long to a certain extent, the power transmission efficiency is lowered in the resonance frequency band, as shown in FIG. 4.

As should be understood from the above, the distance C between the power-supply end resonance coil 5 and the power-reception end resonance coil 8 is set to 100 mm, for the purpose of maximizing the power transmission efficiency at the resonance frequency (16 MHz) band, thereby enabling transmission of sufficient effective power required for lighting the blue LED 9, between the power-supply end resonance coil 5 and the power-reception end resonance coil 8.

Note that in the present example, the distance C is set to 100 mm. However, since the effective power required for lighting the blue LED 9 is 0.35 W, the distance C is not limited to this, as long as the resulting power transmission efficiency is 70% or higher. Specifically, as shown n FIG. 4, the power transmission efficiency is 70% or higher in the resonance frequency (16 MHz) band, and transmission of effective power of 0.35 W or higher necessary for lighting the blue LED 9 is possible, when the distance C is set within a range of 88 mm to 105 mm. The range of distance C from 88 mm to 105 mm is referred to as power supply range in which transmission of effective power of 0.35 W or higher necessary for lighting the blue LED 9 is possible.
(Performance)

In the wireless power-supply system 1 structured as described above, the power (0.5 W) supplied from the AC power source 6 to the power-supplying coil 4 is transmitted at the power transmission efficiency of 74% through the electromagnetic inductance between the power-supplying coil 4 and the power-supply end resonance coil 5, utilizing the magnetic resonant state between the power-supply end resonance coil 5 and the power-reception end resonance coil 8, and then output as effective power of 0.35 W or higher which is necessary for lighting the blue LED 9, through the electromagnetic inductance between the power-reception end resonance coil 8 and the power-receiving coil 7. Then, the blue LED 9 having received the effective power lights in blue.

Next, with reference to FIG. 4, the following describes variation in the power transmission efficiency in the wireless power-supply system 1, when the distance C between the power-supply end resonance coil 5 and the power-reception end resonance coil 8 is varied, in the form of lighting status of the blue LED 9 (performance).

Note that the AC power source 6 in the present example outputs power of 0.5 W at a frequency of 16 MHz which is the same as the resonance frequency of the power-supply end resonance coil 5 and the power-reception end resonance coil 8. Given the condition that the power output from the AC power source 6 is 0.5 W, a power transmission efficiency of 70% or higher is needed to light the blue LED 9 whose effective power is 0.35 W is more. A power transmission efficiency of less than 70% will not light the blue LED 9.

Comparative Example 1

As shown in FIG. 4(*a*), where the distance C was set to 20 mm, the power transmission efficiency is approximately 4% and was extremely low in the resonance frequency (16 MHz) band. Therefore, the blue LED 9 did not light.

Comparative Example 2

Next, as shown in FIG. 4 (*b*), when the distance C was set to 50 mm, the power transmission efficiency was approximately 39% in the resonance frequency (16 MHz) band; however, this falls short of the efficiency for yielding the effective power and therefore the blue LED 9 did not light.

Present Example

Next, as shown in FIG. 4(*c*), when the distance C was set to 100 mm, the power transmission efficiency was approximately 74% and was high at the resonance frequency (16 MHz) band. This is sufficient for yielding the effective power for lighting the blue LED 9, and therefore caused the blue LED 9 to light.

Comparative Example 3

Next, as shown in FIG. 4 (*d*), when the distance C was set to 150 mm, the power transmission efficiency dropped to approximately 27% in the resonance frequency (16 MHz), and the blue LED 9 did not light.

As should be understood from the graph of FIG. 4, the power transmission efficiency was 70% or higher (effective power of 0.35 W or higher) in the resonance frequency (16 MHz) band, when the distance C was set within a range from 88 mm to 105 mm (power supply range), thus lighting the blue LED 9. When the distance C was set to the other values, the power transmission efficiency was less than 70% (less than the effective power 0.35 W), and the blue LED 9 did not light. This shows that there actually exists a power supply range in which power transmission of power equal to or higher than a predetermined effective power is possible, and that the present invention is sufficiently feasible with the presence of the power supply range.

The wireless power-supply system 1 (wireless power-supply method) enables transmission of power (0.5 W) supplied from the AC power source 6 in the form of electromagnetic energy, from the power-supplying resonator 2 to the power-receiving resonator 3, by tuning the power-supplying resonator 2 and the power-receiving resonator 3 to the resonance frequency of 16 MHz thus creating a magnetic resonant state between the power-supplying resonator 2 and the power-receiving resonator 3. The blue LED 9 lights in blue upon reception of power of 0.35 W or higher which is the effective power for lighting the blue LED 9, and does not light when the power received is less than the effective power of 0.35 W.

The distance C between the power-supply end resonance coil 5 of the power-supplying resonator 2 and the power-reception end resonance coil 8 of the power-receiving resonator 3 is set to 100 mm which falls within the range of 88 mm to 105 mm, so that the rate of power output to the blue LED 9 relative to the power supplied to the power-supplying resonator 2 at the resonance frequency band of 16 MHz (power transmission efficiency) is 70% or higher, i.e., power of 0.35 W or higher which is the effective power needed for lighting the blue LED 9 is output. While the distance C is within the range of approximately 88 mm to 105 mm, the power-receiving resonator 3 is able to receive the effective power of 0.35 W or higher and outputs the effective power to light the blue LED 9. On the other hand, when the distance C is out of the range from the 88 mm to 105 mm, the power transmission efficiency of the power received by the power-receiving resonator 3 drops, and the effective power necessary for lighting the blue LED 9 is not received. Thus, the effective power necessary for lighting the blue LED 9 is output to light the blue LED 9, when the power-supply end resonance coil 5 of the power-supplying resonator 2 and the power-reception end resonance coil 8 of the power-receiving resonator 3 satisfies the positional relation, i.e., only when the distance C is within the range of 88 mm to 105 mm.

That is, setting the positional relation between the power-supply end resonance coil 5 of the power-supplying resonator 2 and the power-reception end resonance coil 8 of the power-receiving resonator 3 so that the distance C is within the range of 88 mm to 105 mm enables transmission of effective power (0.35 W) or higher in the form of electromagnetic energy through the resonance between the power-supply end resonance coil 5 and the power-reception end resonance coil 8. Thus, only when the power-supplying resonator 2 and the power-receiving resonator 3 satisfies the above positional relation, they are in the power supply range and able to conduct power transmission of the effective power.

Further, the above structure enables power transmission from the power-supplying coil 4 to the power-supply end resonance coil 5 by means of electromagnetic inductance, without a need of creating a magnetic resonant state between the power-supplying coil 4 and the power-supply end resonance coil 5. Similarly, the structure enables power transmission from the power-reception end resonance coil 8 to the power-receiving coil 7 by means of electromagnetic inductance, without a need of creating a magnetic resonant state between the power-reception end resonance coil 8 and the power-receiving coil 7. This eliminates the need of tuning the power-supplying coil 4 and the power-supply end resonance coil 5 to a resonance frequency and tuning the power-reception end resonance coil 8 and the power-receiving coil 7 to a resonance frequency. Thus, designing becomes easier.

Embodiment 1

The following describes a wireless power-supply system 201 related to an embodiment 1 as a specific example of the wireless power-supply system of the present invention described in the above example 1.

As is understood from FIG. 1 and the graph of FIG. 4, when the power-supplying resonator and the power-receiving resonator are tuned to a resonance frequency and a magnetic resonant state is created between the power-supplying resonator and the power-receiving resonator, the power transmission efficiencies measured while the distance between the power-supplying resonator and the power-receiving resonator is varied draw a mountain-like curve with a peak point. That is, setting the distance between the power-supplying resonator and the power-receiving resonator to the value corresponding to the peak point maximizes the power transmission efficiency. Further, when the distance between the power-supplying resonator and the power-receiving resonator is shortened from the distance Corresponding to the peak point, the power transmission efficiency drops. Further, when the distance between the power-supplying resonator and the power-receiving resonator is made longer than the distance Corresponding to the peak point, the power transmission efficiency drops. The power transmission efficiency here means a rate of power output from the power-receiving resonator relative to the power supplied to the power-supplying resonator.

The wireless power-supply system 201 related to the embodiment 1 is a wireless power-supply system utilizing variation in the power transmission efficiency which takes place when the positional relation between the power-supplying resonator and the power-receiving resonator is varied.

(Structure of Wireless Power-Supply System 201)

Figure 5:
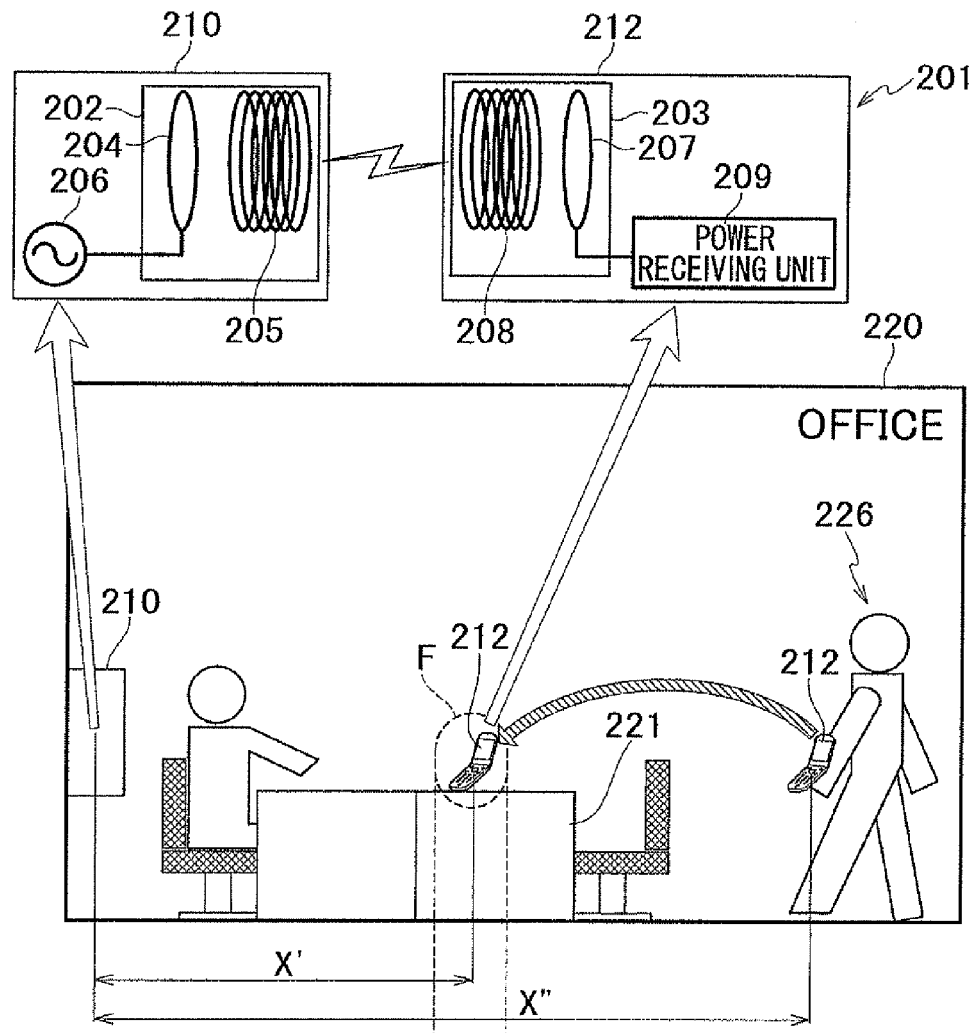
FIG. 5 is an explanatory diagram of a wireless power-supply system related to an embodiment 1.

FIG. 5 is an explanatory diagram of the wireless power-supply system 201 related to the embodiment 1. The wireless power-supply system 201 shown in FIG. 5 is structured by a power transmission device 210 hooked on a wall of an office 220; and a power-receiving device such as a mobile phone 212 placed on a desk 221. The power transmission device 210 includes an AC power source 206 and a power-supplying resonator 202, and the power-supplying resonator 202 includes a power-supplying coil 204 connected to the AC power source 206 and a power-supply end resonance coil 205. The power-receiving device such as the mobile phone 212 includes a power-receiving unit 209 and a power-receiving resonator 203, and the power-receiving resonator 203 includes a power-receiving coil 207 connected to the power-receiving unit 209 and a power-reception end resonance coil 208. In the following case shown in FIG. 5, the mobile phone 212 is carried by a human 226 and is distance X" away from the power transmission device 210. Then the mobile phone 212 is placed on the desk 221 and is distance X' away from the power transmission device 210.

The power-supplying coil 204 plays a role of supplying power from the AC power source 206 to the power-supply end resonance coil 205 by means of electromagnetic inductance. The distance between the power-supplying coil 204 and the power-supply end resonance coil 205 is defined as distance A. Note that the arrangement of the power-supplying coil 204 and the power-supply end resonance coil 205 is not limited as long as the distance therebetween allows occurrence of electromagnetic inductance.

As described, the power transmission to the power-supply end resonance coil 205 through the power-supplying coil 204 by means of electromagnetic inductance eliminates the need for electrically connecting the power-supply end resonance coil 205 with another circuit. This allows more freedom and higher accuracy in designing of the power-supply end resonance coil 205.

The power-receiving coil 207 plays a role of outputting to the power-receiving unit 209, by means of electromagnetic inductance, the power transmitted in the form of electromagnetic energy from the power-supply end resonance coil 205 to the power-reception end resonance coil 208. The distance between the power-reception end resonance coil 208 and the power-receiving coil 207 is defined as distance B. Note that the arrangement of the power-receiving coil 207 and the power-reception end resonance coil 208 is not limited as long as the distance therebetween allows occurrence of electromagnetic inductance.

The power transmitted from the power-reception end resonance coil 208 to the power transmission under the magnetic resonant state is transmitted as energy from the power-reception end resonance coil 208 to the power-receiving coil 207 by means of electromagnetic inductance. The power-receiving coil 207 is electrically connected to the power-receiving unit 209, and outputs, to the power-receiving unit 209 as its power, the energy having been transmitted from to the power-receiving coil 207 by means of electromagnetic inductance.

As described, power transmission from the power-reception end resonance coil 208 to the power-receiving unit 209 through the power-receiving coil 207 by means of electromagnetic inductance eliminates the need for electrically connecting the power-reception end resonance coil 208 to another circuit. This allows more freedom and higher accuracy in designing of the power-reception end resonance coil 208.

The power-supply end resonance coil 205 and the power-reception end resonance coil 208 are each an LC resonance circuit which creates a magnetic resonant state. Note that the present embodiment adopts an element as a capacitor component of the LC resonance circuit; however, it is possible to adopt a stray capacitance by leaving the both ends of the coil opened. In this LC resonance circuit, the resonance frequency is f derived from (formula 1), where the inductance is L and the capacity of capacitor is C.

Further, it is necessary to set the same resonance frequency f defined by the (formula 1) in the power-supply end resonance coil 205 and the power-reception end resonance coil 208. Note that it is not necessary to make the shapes of the coils the same, in order to make the resonance frequency f the same.

As described, when the resonance frequency of the power-supply end resonance coil 205 and the resonance frequency of the power-reception end resonance coil 208 are equal to each other, the magnetic resonant state is created between the power-supply end resonance coil 205 and the power-reception end resonance coil 208. Creating the magnetic resonant state while the power-supply end resonance coil 205 is resonating enables power transmission from the power-supply end resonance coil 205 to the power-reception end resonance coil 208 in the form of electromagnetic energy.

Where the distance between the power-supply end resonance coil 205 of the power transmission device 210 and the power-reception end resonance coil 208 of the mobile phone 212 is distance C, the mobile phone 212 (power-reception end resonance coil 208) carried by the human 226 is distance X" away from the power transmission device 210 (power-supply end resonance coil 205), as shown in FIG. 5. The mobile phone 212 (power-reception end resonance coil 208), when moved to the desk 221, is distance X' away from the power transmission device 210 (power-supply end resonance coil 205).

The AC power source 206 outputs power at the same frequency as the resonance frequency of the power-supply end resonance coil 205 and the power-reception end resonance coil 208.

The power-receiving unit 209 includes a rectifier circuit connected to the power-receiving coil 207, a power charge control device connected to the rectifier circuit, and a battery connected to the power charge control device. The power-receiving unit 209 plays a role of charging the battery with the power transmitted from the power-receiving coil 207 via the rectifier circuit, and the power charge control device. Examples of the battery include a nickel metal hydride battery, a lithium-ion battery, or other secondary batteries. Further, the power charge control device plays a role of performing control so that the battery is charged when the effective power necessary for charging is input. Therefore, when power less than the effective power is input, the battery is not charged. Note that the effective power needed for charging the battery is input when the rate of power output from the power-receiving resonator 203 relative to the power supplied to the power-supplying resonator 202 (power transmission efficiency) is 70% or higher (see FIG. 5).

(Performance)

In the wireless power-supply system 201 with the above described structure, the power supplied from the AC power source 206 is supplied to the power-receiving unit 209 of the mobile phone 212, through the electromagnetic inductance between the power-supplying coil 204 and the power-supply end resonance coil 205, power transmission utilizing the magnetic resonant state between the power-supply end resonance coil 205 and the power-reception end resonance coil 208, and the electromagnetic inductance between the power-reception end resonance coil 208 and the power-receiving coil 207, the mobile phone 212 placed on the desk 221 so that the distance C between the power-supply end resonance coil 205 of the power transmission device 210 and the power-reception end resonance coil 208 is X'. On the other hand, the power is not supplied to the mobile phone 212, when it is carried by the human 226 and the distance C between the power-supply end resonance coil 205 of the power transmission device 210 and the power-reception end resonance coil 208 is X".

The battery of the power-receiving unit 209 of the mobile phone 212 on the desk 221 is charged, because the distance C between the power-supply end resonance coil 205 of the power transmission device 210 and the power-reception end resonance coil 208 is set at the distance X' so that the power transmission efficiency of 70% or higher is achieved and the effective power necessary for charging the battery of the mobile phone 212 is ensured at the resonance frequency. In the present embodiment, the distance C=X'. However, the distance C may be any distance provided that the power transmission efficiency of 70% or higher is achieved. Specifically, as shown in FIG. 5, when the distance C is set between Y to Y', the power transmission efficiency of 70% or higher is achieved and transmission of effective power necessary for charging the battery of the mobile phone is possible at the resonance frequency. Here, the range of distance C between Y to Y' is referred to as power supply range F in which transmission of effective power necessary for charging the battery of the power-receiving unit 209 is possible.

On the other hand, there is mentioned hereinabove that the battery of the power-receiving unit 209 of the mobile phone 212 is not charged when the mobile phone 212 is carried by the human 226. This is because the distance C between the power-supply end resonance coil 205 of the power transmission device 210 and the power-reception end resonance coil 208 of the mobile phone 212 is set to the distance X" at which effective power necessary for charging the battery of the power-receiving unit 209 of the mobile phone 212 is not ensured (power transmission efficiency falling short of 70%) at the resonance frequency. That is, as shown in FIG. 5, when the human 226 carries the mobile phone 212, the mobile phone 212 is out of the power supply range F. Therefore, the battery of the mobile phone 212 is not charged.

Thus, charging is not possible while the mobile phone 212 is out of the power supply range F; however, is possible when the mobile phone 212 is brought within the power supply range F. In short, the battery of the mobile phone 212 is possible only within a limited range (power supply range F).

(Wireless Power-Supply Method)

Describing the above as a wireless power-supply method supposing that the power transmission device 210 is fixed to a wall of the office 220, the power supply range F is set at a range of distance from Y to Y' in which the power transmission efficiency of 70% is achieved and effective power necessary for charging the battery of the mobile phone 212 is ensured at the resonance frequency. The mobile phone 212 is moved to the desk 221 so that the distance C between the power-supply end resonance coil 205 of the power transmission device 210 and the power-reception end resonance coil 208 of the mobile phone 212 is in the range of distance Y to Y' (power supply range F). The power supplied from the AC power source 206 is transmitted to the power-receiving coil 207 through the electromagnetic inductance between the power-supplying coil 204 and the power-supply end resonance coil 205, power transmission utilizing the magnetic resonant state between the power-supply end resonance coil 205 and the power-reception end resonance coil 208, and the electromagnetic inductance between the power-reception end resonance coil 208 and the power-receiving coil 207. Then, the power having transmitted from the power-receiving coil 207 is stored in the battery as effective power necessary for charging the battery, through the rectifier circuit and the power charge control device of the power-receiving unit 209.

With the above structure, the battery of the power-receiving unit 209 is charged only when the power-receiving device such as the mobile phone 212 is placed within the power supply range F, as shown in FIG. 5.

Example 2

Figure 6:
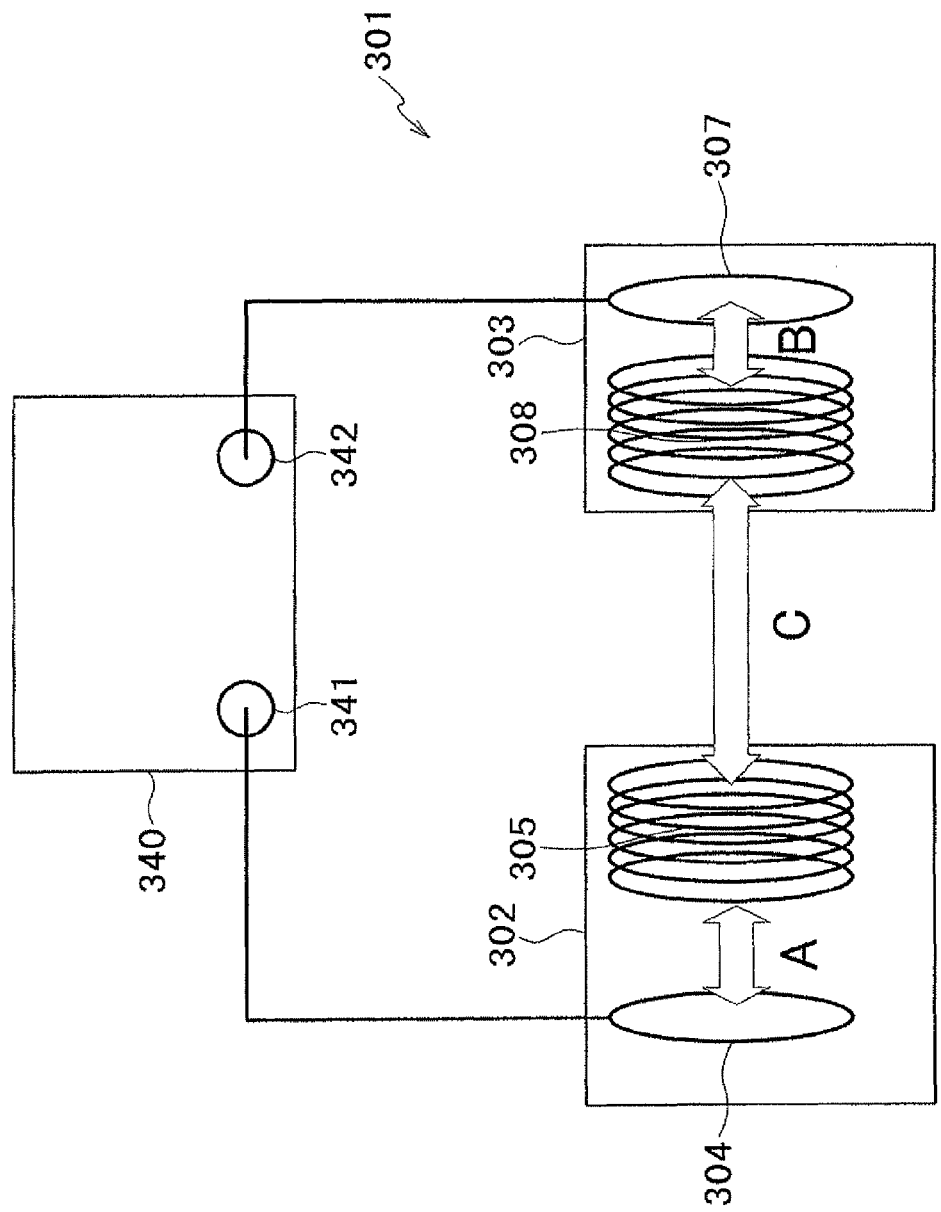
FIG. 6 is a diagram showing a schematic configuration of a wireless power-supply system related to an example 2.
Figure 7:
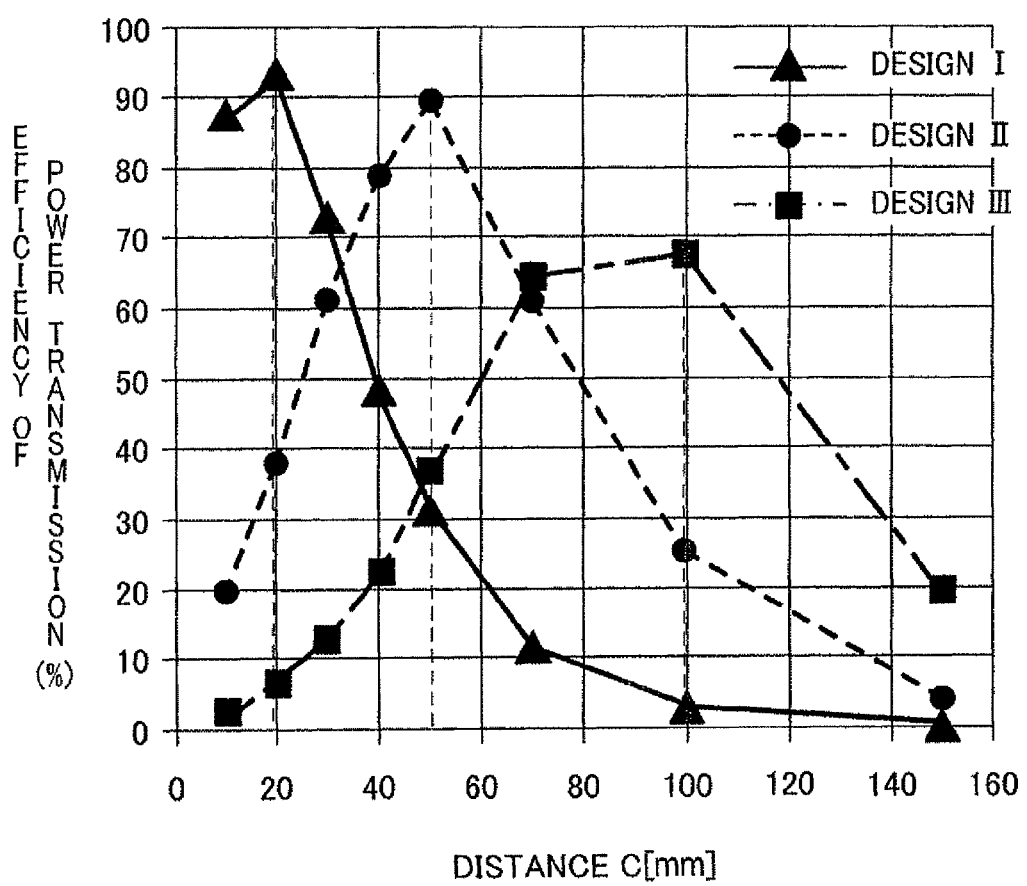
FIG. 7 is an explanatory diagram explaining a distance C at which the power transmission efficiency is maximized, when the distance A between the power-supplying coil and the power-supply end resonance coil and the distance B between the power-reception end resonance coil and the power-receiving coil are varied.

The following describes a wireless power-supply system 301 related to an example 2, with reference to FIG. 6 and FIG. 7.

With reference to FIG. 6 and FIG. 7, the following describes that the wireless power-supply system 301 allows freedom in setting the distance C between the power-supply end resonance coil 305 and the power-reception end resonance coil 308 that maximizes the power transmission efficiency, by changing at least one of a distance A between the power-supplying coil 304 and the power-supply end resonance coil 305 and the distance B between the power-reception end resonance coil 308 and the power-receiving coil 307.

(Structure of Wireless Power-Supply System 301)

The wireless power-supply system 301 shown in FIG. 6 is a system including a power-supplying resonator 302 and a power-receiving resonator 303, and transmits power in the form of electromagnetic energy from the power-supplying resonator 302 to the power-receiving resonator 303. As shown in FIG. 6, the power-supplying resonator 302 includes a power-supplying coil 304 and a power-supply end resonance coil 305. The power-receiving resonator 303 includes therein a power-receiving coil 307 and a power-reception end resonance coil 308.

The power-supplying coil 304 and the power-receiving coil 307 each has a coil diameter of 100 mmφ, and is formed by winding once a circular copper wire rod (coated by insulation film) of 1 mmφ in diameter. To the power-supplying coil 304 is connected an output terminal 341 of a network analyzer 340 (Agilent Technologies, Inc.) in place of an AC power source, and to the power-receiving coil 307 is connected an input terminal 342 of the network analyzer.

The network analyzer 340 is capable of outputting AC power of any given frequency from its output terminal 341 to the power-supplying coil 304. Further, the network analyzer 340 is capable of measuring the power input from the power-receiving coil 307 to the input terminal 342. Further, as shown in FIG. 7, the network analyzer 340 is capable of measuring the power transmission efficiency.

The power-supply end resonance coil 305 and the power-reception end resonance coil 308 are each an LC resonance circuit, and the power-supply end resonance coil 305 and the power-reception end resonance coil 308 each has a coil diameter of 100 mmφ, and is formed by a circular copper wire rod (coated by insulation film) of 1 mmφ in diameter, which is wound three times in the form of solenoid. The resonance frequency f which is derived from (formula 1) needs to be the same in the power-supply end resonance coil 305 and the power-reception end resonance coil 308. Therefore, the resonance frequency is set to 15 MHz.

The distance A between the power-supplying coil 304 and the power-supply end resonance coil 305 is a direct distance between the coil surface of the power-supplying coil 304 and the coil surface of the power-supply end resonance coil 305, when these coil surfaces are arranged face to face so as not to be perpendicular to each other. Similarly, the distance B between the power-reception end resonance coil 308 and the power-receiving coil 307 is a direct distance between the coil surface of the power-receiving coil 307 and the coil surface of the power-reception end resonance coil 308, when these coil surfaces are arranged so as not to be perpendicular to each other. Further, the distance C between the power-supply end resonance coil 305 and the power-reception end resonance coil 308 is a direct distance between the coil surface of the power-supply end resonance coil 305 and the coil surface of the power-reception end resonance coil 308, when these coil surfaces are arranged face to face so as not to be perpendicular to each other.

For the wireless power-supply system 301, the distance C between the power-supply end resonance coil 305 and power-reception end resonance coil 308 which maximizes the power transmission efficiency was measured by using the network analyzer 340, while varying the distance A between the power-supplying coil 304 and the power-supply end resonance coil 305 and the distance B between the power-reception end resonance coil 308 and the power-receiving coil 307. The following describes distance C resulting from the measurement, with reference to FIG. 7. In the graph in FIG. 7, the horizontal axis represents the distance C, and the vertical axis represents the power transmission efficiency.

The curve of Design I in the graph of FIG. 7 plots the power transmission efficiencies resulting from various distances C between the power-supply end resonance coil 305 and power-reception end resonance coil 308, while the distance A between the power-supplying coil 304 and the power-supply end resonance coil 305 and the distance B between the power-reception end resonance coil 308 and the power-receiving coil 307 are both set to 1 mm (A=B=1 mm). The results show that the power transmission efficiency is maximized when the distance C is 20 mm.

Next, the curve of Design II plots the power transmission efficiencies resulting from various distances C between the power-supply end resonance coil 305 and power-reception end resonance coil 308, while the distance A between the power-supplying coil 304 and the power-supply end resonance coil 305, and the distance B between the power-reception end resonance coil 308 and the power-receiving coil 307 are both set to 7 mm (A=B=7 mm). The results show that the power transmission efficiency is maximized when the distance C is set to 50 mm.

Next, the curve of Design III plots the power transmission efficiency resulting from various distances C between the power-supply end resonance coil 305 and power-reception end resonance coil 308, while the distance A between the power-supplying coil 304 and the power-supply end resonance coil 305 and the distance B between the power-reception end resonance coil 308 and the power-receiving coil 307 are both set to 17 mm (A=B=17 mm). The results show that the power transmission efficiency is maximized when the distance C is 100 mm.

From the above, it should be understood that the distance C between the power-supply end resonance coil 305 and power-reception end resonance coil 308, where the power transmission efficiency is maximized, varies with variation in the distance A between the power-supplying coil 304 and the power-supply end resonance coil 305 and the distance B between the power-reception end resonance coil 308 and the power-receiving coil 307.

Embodiment 2

Given the measurement results of the above example 2, the wireless power-supply system 401 related to an embodiment 2 is described below. The wireless power-supply system 401 related to the embodiment 2 is a wireless power-supply system, in which a distance A between a power-supplying coil 404 and a power-supply end resonance coil 405 and/or a distance B between a power-reception end resonance coil 408 and a power-receiving coil 407 is variable so as to allow freedom in setting a distance C between the power-supply end resonance coil 405 and the power-reception end resonance coil 408, where power transmission efficiency is maximized. Note that descriptions about the structures identical as those in the embodiment 1 are omitted.

(Structure of Wireless Power-Supply System 401)

FIG. 8 is an explanatory diagram of the wireless power-supply system 401 related to the embodiment 2. The wireless power-supply system 401 shown in FIG. 8 includes a power transmission device 410 hooked on a wall of an office 420 and a power-receiving device such as a mobile phone 412 placed on a desk 421, as in the embodiment 1. The power transmission device 410 has an AC power source 406, a power-supplying resonator 402, and an adjuster 418, and the power-supplying resonator 402 includes the power-supplying coil 404 connected to the AC power source 406 and the power-supply end resonance coil 405. The adjuster 418 is capable of variably adjusting the distance A between the power-supplying coil 404 and the power-supply end resonance coil 405. Further, the mobile phone 412 includes a power-receiving unit 409 and a power-receiving resonator 403, and the power-receiving resonator 403 includes the power-receiving coil 407 connected to the power-receiving unit 409 and the power-reception end resonance coil 408.

As shown in FIG. 8(a), suppose the positional relation between the power-supplying resonator 402 and the power-receiving resonator 403 is variably adjusted by the adjuster 418 so that distance A=a (the distance B is fixed to a constant value) and the distance C=c, the distance C being a distance where the power transmission efficiency is maximized. In this case, within a power supply range G shown in FIG. 8, it is possible to achieve the power transmission efficiency that allows transmission of effective power or more necessary for charging the battery of the power-receiving unit 409 in the mobile phone 412.

With the above setting, the battery is charged when the power-receiving device such as the mobile phone 412 is within the power supply range G shown in FIG. 8. On the other hand, the battery is not charged when the power-receiving device such as the mobile phone 412 is placed outside the power supply range G shown in FIG. 8.

Next, as shown in FIG. 8(b), suppose the positional relation between the power-supplying resonator 402 and the power-receiving resonator 403 is variably adjusted by the adjuster 418 so that distance A=a' (the distance B is fixed to a constant value) and the distance C=c', the distance C being a distance where the power transmission efficiency is maximized. In this case, within a power supply range H shown in FIG. 8, it is possible to achieve the power transmission efficiency that allows transmission of effective power or more necessary for charging the battery of the power-receiving unit 409 in the mobile phone 412.

With the above setting, the battery is charged when the power-receiving device such as the mobile phone 412 is within the power supply range H shown in FIG. 8. On the other hand, the battery is not charged when the power-receiving device such as the mobile phone 412 is placed outside the power supply range H shown in FIG. 8.

Next, as shown in FIG. 8(c), suppose the positional relation between the power-supplying resonator 402 and the power-receiving resonator 403 is variably adjusted by the adjuster 418 so that distance A=a" (the distance B is fixed to a constant value) and the distance C=c", the distance C being a distance where the power transmission efficiency is maximized. In this case, within a power supply range I shown in FIG. 8, it is possible to achieve the power transmission efficiency that allows transmission of effective power or more necessary for charging the battery of the power-receiving unit 409 in the mobile phone 412.

With the above setting, the battery is charged when the power-receiving device such as the mobile phone 412 is within the power supply range I shown in FIG. 8. On the other hand, the battery is not charged when the power-receiving device such as the mobile phone 412 is placed outside the power supply range I shown in FIG. 8.

The wireless power-supply system 401 allows freedom in setting of the power supply range (e.g., power supply range G, power supply range H, power supply range I) which, at the resonance frequency, brings about a power transmission efficiency for enabling transmission of effective power or more needed for charging the battery, simply by freely setting the distance A between the power-supplying coil 404 and the power-supply end resonance coil 405, and/or the distance B between the power-reception end resonance coil 408 and the power-receiving coil 407. In short, the system 401 allows freedom in setting the power supply range that allows charging of the battery.

Embodiment 3

Figure 9:
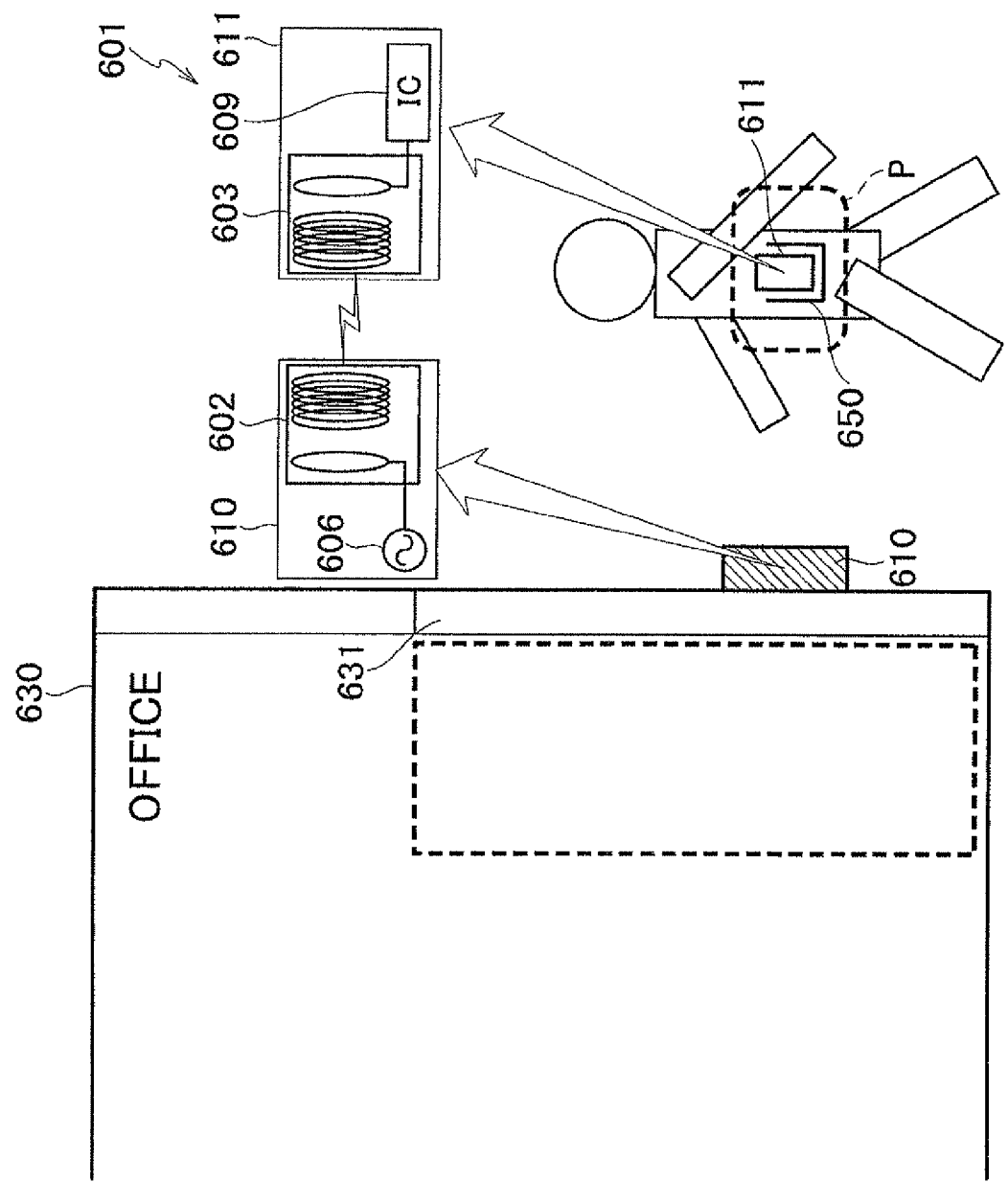
FIG. 9 is an explanatory diagram showing a wireless power-supply system related to an embodiment 3.

As shown in FIG. 9, a wireless power-supply system 601 related to the present invention may be adopted to a contactless IC card for entering an office. Specifically, a card reader 610 (having a power-supplying resonator 602 connected to an AC power source 606) is installed on a wall, by a door 631 of an office 630, and an IC card 611 having a power-receiving resonator 603 connected to an individual-identification IC chip 609 is prepared. Then, as shown in FIG. 9, the power supply range P which achieves the power transmission efficiency for enabling transmission of effective power necessary for reading the IC chip 609 is set to the vicinity in front of the door 631.

With the above structure, the IC chip is read when a person with the IC card 611 in his/her pocket 650 passes the power supply range P, and the door 631 automatically opens upon completion of identifying the individual.

Other Embodiments

Further, for example, the wireless power-supply system related to the present invention may be applied to a power supply device for a working robot, an electric vehicle, or the like. In cases of adopting it to the working robot, the power supply range For enabling transmission of effective power or more necessary for operating the working robot is set to a working area. This allows operation of the working robot to be stopped when it is out of the working area. Therefore, when the working robot goes out of the working area for some reasons, it is possible to stop the working robot by stopping the power supply thereto, which is advantageous in terms of the safety of the working robot.

The above embodiment 1 deals with a case where the same resonance frequency is set in the power-supply end resonance coil 205 on the side of the power transmission device 210 and the power-reception end resonance coil 208 on the side of the mobile phone 212 so as to enable transmission of power in the form of electromagnetic energy from the power-supply end resonance coil 205 to the power-reception end resonance coil 208 of the mobile phone 212; however, the present invention is not limited to this.

For example, suppose that the resonance frequency of the power-reception end resonance coil in a mobile phone is 15 MHz, and the resonance frequency of the power-reception end resonance coil in a personal computer is 16 MHz, and the resonance frequency of the power-reception end resonance coil in a tablet PC is 14 MHz. Suppose further that the mobile phone, the personal computer, and the tablet PC are placed within the power supply range F. In this case, on the side of the power transmission device, power-supply end resonance coils whose resonance frequencies are 14 MHz, 15 MHz, and 16 MHz, respectively, are prepared. In this way, by freely converting the power transmission frequency of the AC power source transmitted to the power-supply end resonance coil amongst 14 MHz, 15 MHz, and 16 MHz, it is possible to individually transmit power in the form of electromagnetic energy through any of the power-supply end resonance coils and the resonating one of the power-reception end resonance coils. In other words, setting the power transmission frequency of the AC power source to 14 MHz and supplying the power to the power-supply end resonance coil whose resonance frequency is 14 MHz only transmits the power to the power-reception end resonance coil of the tablet PC whose resonance frequency is 14 MHz (no power is transmitted to the power-reception end resonance coils of the mobile phone and the personal computer whose resonance frequencies do not match). Similarly, setting the power transmission frequency of the AC power source to 15 MHz and supplying the power to the power-supply end resonance coil whose resonance frequency is 15 MHz only transmits the power to the power-reception end resonance coil of the mobile phone whose resonance frequency is 15 MHz (no power is transmitted to the power-reception end resonance coils of the personal computer and the tablet PC whose resonance frequencies do not match). Similarly, setting the power transmission frequency of the AC power source to 16 MHz and supplying the power to the power-supply end resonance coil whose resonance frequency is 16 MHz only transmits the power to the power-reception end resonance coil of the personal computer whose resonance frequency is 16 MHz (no power is transmitted to the power-reception end resonance coils of the mobile phone and the tablet PC whose resonance frequencies do not match).

In this case, it is possible to supply power to desirable one of the mobile phone, the personal computer, and the tablet PC in the power supply range F, simply by converting the power transmission frequency on the side of the power transmission device.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the invention, not to limit it. Further, it will be understood by those skilled in the art that the other structures, systems, methods and the like included in the spirit of the invention can be easily derived from the spirit of the invention described in the specification. Accordingly, it should be considered that the invention covers equivalent structures thereof without departing from the spirit and scope of the invention as defined in the following claims. Further, it is required to sufficiently refer to the documents that have been already disclosed, so as to fully understand the objects and effects of the invention.

REFERENCE SIGNS LIST 1 wireless power-supply system
2 power-supplying resonator
3 power-receiving resonator
4 power-supplying coil
5 power-supply end resonance coil
6 AC power source
7 power-receiving coil
8 power-reception end resonance coil
9 blue LED

The invention claimed is:

1. A wireless power-supply system comprising:
a power transmission device including a power supply unit configured to supply power, and a power-supplying resonator configured to transmit the power supplied from the power supply unit in the form of electromagnetic energy; and
a movable power-receiving device including a power-receiving resonator and a power-receiving unit, the power receiving resonator having a same resonance frequency as that of the power-supplying resonator and being configured to receive the electromagnetic energy transmitted from the power-supplying resonator in the form of power, the power-receiving unit being configured to operate when the power received by the power-receiving resonator is predetermined effective power or more, wherein:
an area of a predetermined distance from the power transmission device is set as a power supply range, the predetermined distance being defined so as to correspond to a positional relation between the power-supplying resonator and the power-receiving resonator in which power transmitted in the form of electromagnetic energy by having the power-supplying resonator and the power-receiving resonator resonate with each other yields the predetermined effective power or more; and the power-receiving unit is configured to operate only when the power-receiving device is within the power supply range.

2. The wireless power-supply system according to claim 1,
wherein
the positional relation between the power-supplying resonator and the power-receiving resonator is such that, at the resonance frequency band, a rate of the power output to the power-receiving unit relative to the power supplied to the power-supplying resonator is a rate that yields the effective power or more.

3. The wireless power-supply system according to claim 2, wherein:
the power-supplying resonator includes a power-supplying coil connected to the power supply unit and a power-supply end resonance coil; and
the power-receiving resonator includes a power-receiving coil connected to the power-receiving unit and a power-reception end resonance coil.

4. The wireless power-supply system according to claim 3, wherein:
a first distance between the power-supplying coil and the power-supply end resonance coil and/or a second distance between the power-reception end resonance coil and the power-receiving coil is freely settable.

5. A wireless power-supply method for a wireless power-supply system,
the system comprising:
a power transmission device including a power supply unit configured to supply power, and a power-supplying resonator configured to transmit the power supplied from the power supply unit in the form of electromagnetic energy; and
a movable power-receiving device including a power-receiving resonator and a power-receiving unit, the power-receiving resonator having a same resonance frequency as that of the power-supplying resonator and being configured to receive the electromagnetic energy transmitted from the power-supplying resonator in the form of power, the power-receiving unit being configured to operate when the power received by the power-receiving resonator is predetermined effective power or more,
the method comprising:
setting an area of a predetermined distance from the power transmission device as a power supply range, the predetermined distance being defined so as to correspond to a positional relation between the power-supplying resonator and the power-receiving resonator in which power transmitted in the form of electromagnetic energy by having the power-supplying resonator and the power-receiving resonator resonate with each other yields the predetermined effective power or more, and causing the power-receiving unit to operate only when the power-receiving device is within the power supply range.

6. A wireless power-supply system comprising:
a power transmission device including a power supply unit configured to supply power, and a power-supplying resonator configured to transmit the power supplied from the power supply unit in the form of electromagnetic energy; and a plurality of movable power-receiving devices each including a power-receiving resonator and a power-receiving unit, the power receiving resonator having a same resonance frequency as that of the power-supplying resonator and being configured to receive the electromagnetic energy transmitted from the power-supplying resonator in the form of power, the power-receiving unit being configured to operate when the power received by the power-receiving resonator is predetermined effective power or more, wherein:

values of the predetermined effective power of the power-receiving devices are different from each other; and for each power-receiving device, an area of a predetermined distance from the power transmission device is set as a power supply range, the predetermined distance being defined so as to correspond to a positional relation between the power-supplying resonator and the power-receiving resonator of the power-receiving device in which power transmitted in the form of electromagnetic energy by having the power-supplying resonator and the power-receiving resonator resonate with each other yields the predetermined effective power or more, and each power-receiving unit is configured to operate only when the corresponding power-receiving device is within its power supply range.

* * * * *